United States Patent
Aldrich et al.

(10) Patent No.: US 10,810,199 B2
(45) Date of Patent: Oct. 20, 2020

(54) CORRELATION OF INPUT AND OUTPUT PARAMETERS FOR A FUNCTION IN A DATABASE MANAGEMENT SYSTEM

(71) Applicant: International Business Machines Corporation, Armonk, NY (US)

(72) Inventors: Craig S. Aldrich, Rochester, MN (US); Mark J. Anderson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 16/117,035

(22) Filed: Aug. 30, 2018

(65) Prior Publication Data

US 2020/0073985 A1   Mar. 5, 2020

(51) Int. Cl.
*G06F 17/00*  (2019.01)
*G06F 16/2453*  (2019.01)

(52) U.S. Cl.
CPC ............. *G06F 16/24542* (2019.01)

(58) Field of Classification Search
None
See application file for complete search history.

(56) References Cited

U.S. PATENT DOCUMENTS

| 7,577,637 | B2 | 8/2009 | Ghosh | |
|---|---|---|---|---|
| 8,812,491 | B2 | 8/2014 | Singh et al. | |
| 2005/0210023 | A1 | 9/2005 | Barrera et al. | |
| 2006/0235837 | A1* | 10/2006 | Chong | G06F 16/24534 |
| 2012/0191642 | A1* | 7/2012 | George | G06F 16/24542 707/602 |
| 2012/0239612 | A1* | 9/2012 | George | G06F 16/254 707/602 |
| 2013/0297587 | A1* | 11/2013 | Singh | G06F 16/2453 707/719 |
| 2014/0095469 | A1* | 4/2014 | Chen | G06F 16/24544 707/714 |

\* cited by examiner

*Primary Examiner* — Anhtai V Tran
(74) *Attorney, Agent, or Firm* — Martin & Associates, LLC; Derek P. Martin

(57) ABSTRACT

A query optimizer improves the efficiency of a computer database system utilizing an input-output correlator used with a create function that indicates a correlation between an input to the function and an output of the function. In an example, the input-output correlator is an OR OUTPUT parameter of a create table function. The query optimizer determines whether it can pass a value of a query to the input of the function in response to the input-output correlator. Under appropriate conditions, the query optimizer passes the query value to the input of the function to significantly reduce the amount of data returned by the function thereby reducing the load on database resources.

16 Claims, 6 Drawing Sheets

| Database Data | | 200 |
|---|---|---|
| schema_name 210 | object_name 212 | object_information 214 |
| schema1 | A | object_informationA |
| schema1 | AB | object_informationAB |
| schema1 | ABC | object_informationABC |
| schema2 | X | object_informationX |
| schema2 | XY | object_informationXY |
| schema3 | Z | object_informationZ |
| schema4 | B | object_informationB |

CREATE FUNCTION return_object_information
(schema_name, object_name Default Null OR OUTPUT)

RETURNS TABLE ( schema_name, object_name, object_information)

CREATE VIEW object_informaton AS SELECT a.schema_name,
b.object_name, b.information
FROM Schemas AS a, LATERAL ( SELECT *
FROM TABLE (return_object_information(a.schema_name)) AS x) AS b

FIG. 3B

SELECT * FROM object_information
WHERE object_name = 'ABC'

FIG. 4A

SELECT a.schema_name, b.object_name, b.information
FROM Schemas AS a, LATERAL ( SELECT *
FROM TABLE (return_object_information(a.schema_name, 'ABC')) AS x)
AS b WHERE b.object_name = 'ABC'

FIG. 4B

| return_object_information |||
|---|---|---|
| schema_name | Object Name | Object Information |
| schema1 | ABC | Object_informationABC |

FIG. 4C

| Query Output |||
|---|---|---|
| schema_name | Object Name | Object Information |
| schema1 | ABC | Object_informationABC |

FIG. 4D

SELECT * FROM object_information
WHERE object_name LIKE 'AB%'

SELECT a.schema_name, b.object_name, b.information
FROM Schemas AS a, LATERAL ( SELECT *
FROM TABLE (return_object_information(a.schema_name)) AS x) AS b
WHERE b.object_name LIKE 'AB%'

| return_object_information |||
|---|---|---|
| schema_name | Object Name | Object Information |
| schema1 | A | object_informationA |
| schema1 | AB | object_informationAB |
| schema1 | ABC | object_informationABC |
| schema2 | X | object_informationX |
| schema2 | XY | object_informationXY |
| schema3 | Z | object_informationZ |
| schema4 | B | object_informationB |

FIG. 5C

| Query Output |||
|---|---|---|
| schema_name | Object Name | Object Information |
| schema1 | AB | object_informationAB |
| schema1 | ABC | object_informationABC |

FIG. 5D

CORRELATION OF INPUT AND OUTPUT PARAMETERS FOR A FUNCTION IN A DATABASE MANAGEMENT SYSTEM

BACKGROUND

1. Technical Field

This disclosure generally relates to computer processing, and more specifically relates to a system and method for correlation of input and output parameters to optimize a function referenced in a query such as a table function in a database management system.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A database query typically includes one or more predicate expressions interconnected with logical operators. A predicate expression is a general term given to an expression using one of the four kinds of operators (or their combinations): logical, relational, unary, and boolean. A query usually specifies conditions that apply to one or more columns of the database, and may specify relatively complex logical operations on multiple columns. The database is searched for records that satisfy the query, and those records are returned as the query result.

BRIEF SUMMARY

A query optimizer improves the efficiency of a computer database system utilizing an input-output correlator used with a create function that indicates a correlation between an input to the function and an output of the function. In an example, the input-output correlator is an OR OUTPUT parameter of a create table function. The query optimizer determines whether it can pass a value of a query to the input of the function in response to the input-output correlator. Under appropriate conditions, the query optimizer passes the query value to the input of the function to significantly reduce the amount of data returned by the function thereby reducing the load on database resources.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 2 illustrates a simplified example of database data;

FIG. 3A is an example of a create table function with an input-output correlator;

FIG. 3B is an example of a create view that references the table function in FIG. 3A;

FIG. 4A is an example of a query that uses the view in FIG. 3B;

FIG. 4B is an example of an optimized query for the query of FIG. 4A;

FIG. 4C illustrates the data returned by the table function of the optimized query of FIG. 4B;

FIG. 4D illustrates the data returned by the optimized query of FIG. 4B;

FIG. 5A is another example of a query that uses the view in FIG. 3B;

FIG. 5B is an example of an optimized query for the query of FIG. 5A;

FIG. 5C illustrates the data returned by the table function of the optimized query of FIG. 5B;

FIG. 5D illustrates the data returned by the optimized query of FIG. 5B;

DETAILED DESCRIPTION

Figure 1:
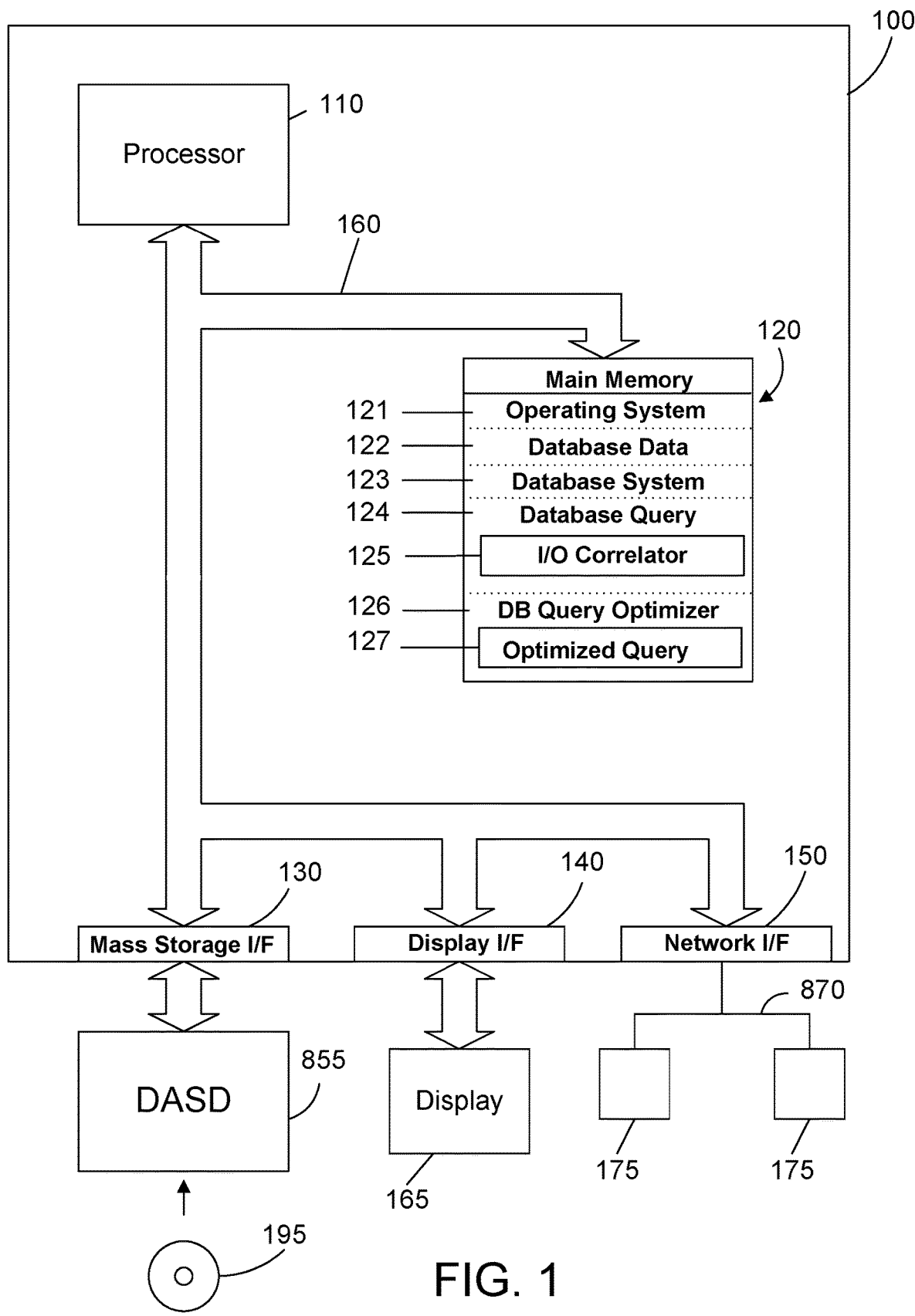
FIG. 1 is a block diagram a computer system with a database system that uses an input-output correlator in conjunction with a create table function to indicate to the query optimizer a correlation between input to the table function and output of the table function.

The disclosure and claims herein relate to a system and method for a query optimizer that improves the efficiency of a computer database system utilizing an input-output correlator used with a create function that indicates a correlation between an input to the function and an output of the function. In an example, the input-output correlator is an OR OUTPUT parameter of a create table function. The query optimizer determines whether it can pass a value of a query to the input of the function in response to the input-output correlator. Under appropriate conditions, the query optimizer passes the query value to the input of the function to significantly reduce the amount of data returned by the function thereby reducing the load on database resources.

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

One popular way to define a query uses Structured Query Language (SQL). SQL defines a syntax for generating and processing queries that is independent of the actual structure and format of the database. A primary type of SQL query is the Select statement. An example select statement in SQL is "Select * from Table1 where C1=4". The Select statement specifies data to be retrieved from a database table. In this example, the "Select *" statement tells the database query processor to select all columns. The "from Table1" statement identifies which database table to search, and the Where clause specifies one or more expressions that must be satisfied for a record to be retrieved.

The expression in the Where clause is where C1=4. Where not specifically stated herein, the term "expression" is intended to mean an arbitrary predicate expression, which can be an entire expression in a query, a portion of an expression in a query, or the entire query and may include logical expressions, relational expressions, unary expressions, boolean expressions, and their combinations.

In the prior art, a tool known as a query optimizer evaluates expressions in a query. When an expression becomes complex, the query optimizer often approaches the expression from multiple perspectives. The query optimizer generates one or more access plans to access the database, and then determines which access plan has the lowest cost or best performance. In many cases, the query optimizer will generate a new or reformulated query to improve performance.

Referring to FIG. 1, a computer system 100 is one suitable implementation of a computer system that is capable of performing the computer operations described herein including using an input-output correlator in conjunction with a create table function to indicate to the query optimizer a correlation between input to the table function and output of the table function. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as mass storage 155, to computer system 100. One specific type of mass storage 155 is a readable and writable CD-RW drive, which may store data to and read data from a CD-RW 195. Some mass storage devices may have a removable memory card or similar instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes database data 122 and a database system 123. The memory 120 also includes a database query 124 that includes an I/O correlator for a function 125. The memory 120 also includes a database query optimizer 126 which creates an optimized query 127 as described further below. The database query optimizer 126 may be part of the database system 123.

Computer system 100 utilizes well known virtual addressing mechanisms that allow the programs of computer system 100 to behave as if they only have access to a large, single storage entity instead of access to multiple, smaller storage entities such as main memory 120 and mass storage 155. Therefore, while operating system 121, database data 122, database system 123, database query 124, I/O correlator 125, DB query optimizer 126 and the optimized query 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the database system 123 and one or more applications that may have a database query 124.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some queries require a large amount of data to be retrieved from the database. It requires a significant amount of computer resources to pull a large amount of data from the database, process the data and then to only return what might be a small amount of data to the application that made the query. One example of such a situation is a query that calls a function that returns a table of data. A query that calls such a function may operate on a very large set of data. The query may only need a small amount of data but may require retrieving a large portion of the data set to satisfy the query. As introduced herein, an input-output (I/O) correlator is used in a create function statement that creates an output row or table to help the query optimizer to prevent retrieving large amounts of data when not needed. The I/O correlator is something placed in the SQL that correlates an input parameter of the function with an output parameter of the same function. The I/O correlator could be placed in an SQL statement by a human programmer, or could be placed in an SQL statement by a computer program that accesses the database using the SQL statement. The I/O correlator may take on different forms in SQL as described further below. The I/O correlator tells the query optimizer that there is a correlation between an input parameter and an output parameter of the function being called. This allows the query optimizer to pass an input value into an optional function parameter in certain situations as described below. When the query optimizer determines it can pass the input to the function the resulting optimized query returns a significantly smaller amount of data from the database thereby reducing the load on database resources.

FIG. 2 illustrates a simplified table of database data 200. The database data 200 represents a partial table of data stored in database data 122 and used in the following examples. In this example, the database data 200 includes object data for a number of schemas that is searched by the example queries discussed below. The database data 200 includes columns for schema_name 210, object_name 212, and object_information 214. Each row of the table has data for an object of a schema. Only a small number of objects are shown for the schemas in the illustrated example for simplicity. In a real database table, there may be a large number of objects for each schema.

FIG. 3A illustrates an example of a create function statement 300 that utilizes a I/O correlator 310. In this example, the create function statement 300 creates a function named return_object_information. The function outputs a table as indicated by the RETURNS TABLE statement. The output table columns include schema_name, object_name and object_information. The function has inputs of schema_name and object_name. The object_name input is an optional function input parameter as indicated by the DEFAULT clause with a NULL value. The DEFAULT clause tells the function to use the default value, in this case NULL, when no value for the optional input is passed to the function. In addition, the object_name input includes an I/O correlator 310. In this example, the I/O correlator 310 is represented by the mnemonic OR OUTPUT. The I/O correlator 310 tells the query optimizer 126 (FIG. 1) that there is a correlation between an input parameter and an output parameter of the function being called. In this example, the I/O correlator 310, namely OR OUTPUT, tells the query optimizer to attempt to use the input parameter for the input object_name to optimize the query as described further below.

FIG. 3B illustrates an example of a create view statement 320 that references the function 300 with the I/O correlator 310 described above. A view is a virtual table defined by an SQL query that represents rows and columns from one or more physical tables. A view can be used to hide the complexity of a query from an application and allows for multiple references to it within a given application or query. In this example, the view is used to hide the complexity of the join and use of the table function and represents a more general purpose way to get object information using a simple SQL query. In FIG. 3B, the CREATE VIEW statement 320 creates a view named 'object_information'. The table view has columns as follows: schema_name, object_name and information. The CREATE VIEW statement 320 is reference in the examples described further below.

FIG. 4A illustrates a query 410 that calls the view object_information created by the create view statement 320 in FIG. 3B. This query returns information about all objects whose name is "ABC" in any schema of the database data shown in FIG. 2. While this query is rather simple, this query would not perform well in the prior art. Without an I/O correlator 310 in the create function statement 300, the optimizer would not know anything about the object_name values that will be returned from the table function. Thus, the query optimizer would need to invoke the table function and have it return ALL the objects for every schema only to throw away most of the results that do not match the value 'ABC'. For this query in the prior art, the function would return all the data shown in FIG. 2 then process that data to get just the objects with the name 'ABC'. However, in response to the I/O correlator 310 specified in the create function statement 300, the query optimizer attempts to optimize the query to pass the output value 'ABC' to the function. The query optimizer is able to pass the output value to the function when the value is an isolatable equal predicate and the query compares the associated result column to a single value as described below. In this example, the value is an isolatable equal predicate so the query optimizer is able to optimize the query to pass the output value to the function.

FIG. 4B illustrates an optimized query 420 for the query 410 of FIG. 4A by the query optimizer in response to the I/O correlator 310 specified in the create function statement 300 in FIG. 3. In the optimized query 420, the function call to return_object_information includes a clause 430 for passing inputs to the functions for schema_name and object_name. In this example, the inputs that are passed to the function are a.schema_name passed as the schema_name and 'ABC' passed as the optional object_name discussed above with reference to FIG. 3. Thus the object_name of 'ABC' is passed to the optional input of the function created by the create function 300 to be used instead of the default value. When the optimized query 420 executes the function, the function return the object_information only for objects having the name 'ABC' rather than object_information for all objects. As a result, the function would return just those schema objects that match the value 'ABC'. The results returned by the function would thus be as shown in FIG. 4C. The query would then operate on just the data in FIG. 4C and would return the data as shown in FIG. 4D. As can be seen in this example, the query will be able execute much more efficiently given the small amount of data returned from the function call in FIG. 4C.

FIG. 5A illustrates another query 510 that calls the view object_information created by the create view statement 320 in FIG. 3B. This query 510 returns information about objects that have a name like the variable 'AB %' from any schema of the database data shown in FIG. 2. This query does not have an isolatable equal predicate. Thus the query optimizer will not be able to optimize the query using the I/O correlator as described herein to pass an I/O parameter to the function. The optimized query 520 for query 510 is shown in FIG. 5B. The optimized query 520 will not pass any value for the optional input (object_name) of the function which will cause the function to use the default value of NULL instead of a passed value. Because this query would not be able to take advantage of the I/O correlator, the function would return all of the database data 200 as shown in FIG. 5C. The query would then operate on the data in FIG. 5C and would return the data as shown in FIG. 5D. Note that the data shown in FIG. 5C is from a simplified example. In practice the amount of data returned by the function may be significantly larger. As can be seen in this simple example, the query 520 will not execute as efficiently as the previous example given the large amount of data returned from the function call.

Each of the above examples included a query that referenced a view. The query examples which reference a view are particularly illustrative of the invention but it is not required for the query to reference a view. For example, if the query optimizer were given a query as shown in FIG. 4B but without the clause 430, the query optimizer would similarly analyze the query as described herein. Upon analyzing such a query, the query optimizer would optimized the query to include the clause 430 and output the optimized query as shown in FIG. 4B.

As introduced above, the query optimizer is able to pass the output value to the function when the value is an isolatable equal predicate and the query compares the associated result column to a single value. The query in FIG. 5A is an example where the query predicate is not an isolatable equal predicate because of the "LIKE" term of the predicate. After determining the query term is an isolatable equal predicate, the query optimizer also determines whether the query compares a result column to a single value. If both of these conditions are met, the query optimizer can then optimize the query to pass the single value to the function. If these conditions are not met, the query optimizer may optimize the query but cannot take advantage of the input-output correlator and the optimized query does not pass a value to the optional input of the function.

As described in the example above, the I/O correlator is preferably an optional parameter of the create function statement. In the above example, the I/O correlator was shown as an "OR OUTPUT" value for the "DEFAULT" clause of the create function statement in SQL. Alternatively, other mnemonics values for the DEFAULT clause could be used such as "CORRELATOR OUTPUT". In addition the I/O correlator could be provided to the query optimizer with an environment variable or an initialization (INI) option. An environment variable or INI option is something that can be set to cause a query to be implemented a certain way. For example, a certain environment variable could be set to indicate that a specified table function has input and output parameter correlation where the names of the parameters match.

Figure 6:
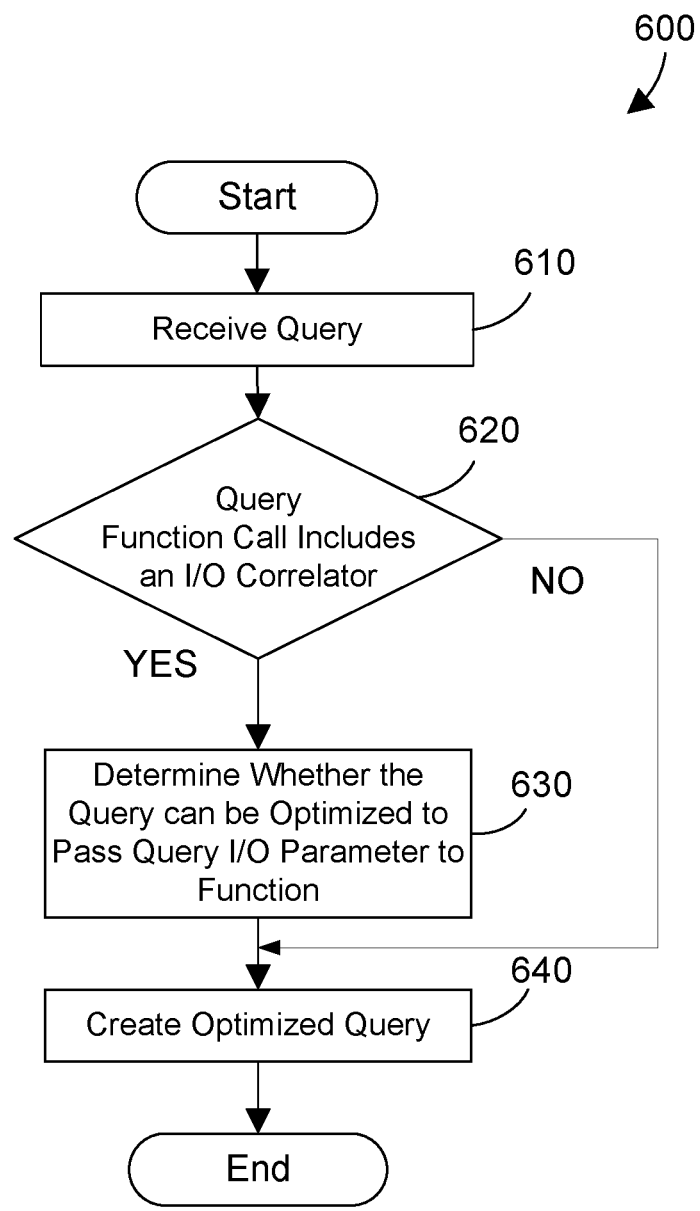
FIG. 6 is a flow diagram of a method for using an input-output correlator in conjunction with a create table function to indicate to the query optimizer a correlation between input to the table function and output of the table function.

Referring to FIG. 6, a method 600 shows one suitable example for using an input-output correlator in conjunction with a create table function to indicate to the query optimizer a correlation between input to the table function and output of the table function. Portions of method 600 are preferably performed by the database system 123 and the database query optimizer 127 shown in FIG. 1. First, receive a query (step 610). Next, determine if the query includes a function call to a function which includes an I/O correlator (step 620). If the query does not include a function call to a function with an I/O correlator (step 620=no), then create an optimized query (step 640) and the method is then done. If the query does include a function call to a function with an I/O correlator (step 620=yes), then determine whether the query can be optimized to pass a query I/O parameter to the function (step 630) and then create an optimized query (step 640). Method 600 is then done.

Figure 7:
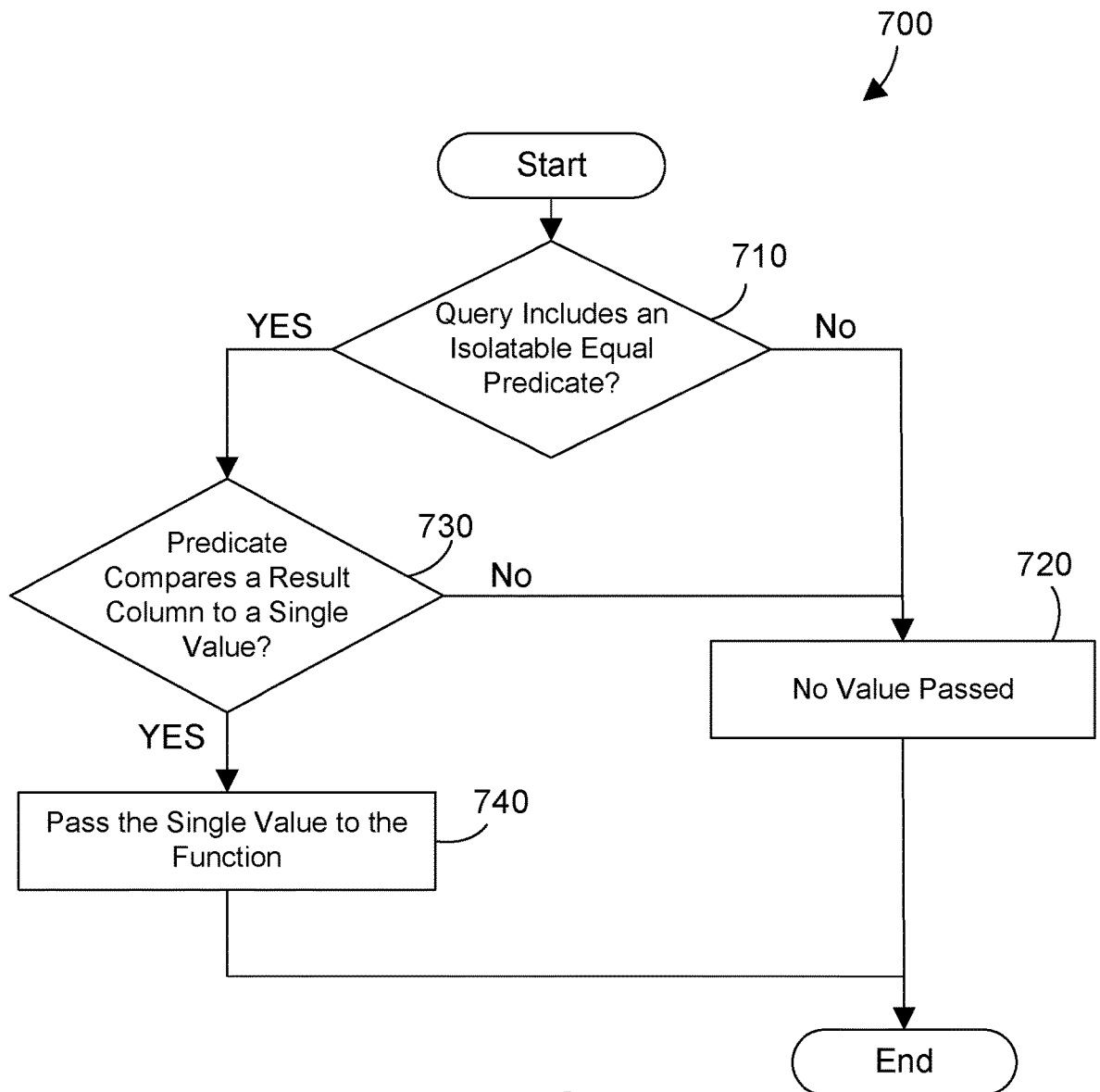
FIG. 7 is a flow diagram of a method for performing step 630 in FIG. 6.

FIG. 7 shows a suitable method 700 for determining whether the query can be optimized to pass a query I/O parameter to the function. Method 700 thus shows one suitable method for performing step 630 in FIG. 6. Determine whether the query that calls the function includes an isolatable equal predicate (step 710). If the query does not include an isolatable equal predicate (step 710=no) then no value is passed to the optional input of the function (step 720) and the method is then done. If the query does include an isolatable equal predicate (step 710=yes) then determine if the query compares a result column to a single value (step 730). If the query does not compare a result column to a single value (step 730=no) then go to step 720. If the query does compare a result column to a single values (step 730=yes) then pass the single value to the function (step 740). The method 700 is then done.

The claims and disclosure herein support an apparatus comprising: at least one processor; a memory coupled to the at least one processor; a database residing in the memory having database data; a create function statement that creates a function with an optional input parameter with an input-output correlator that indicates a correlation between an input to the function and an output of the function; a query that calls the function; and a query optimizer that determines when the query can be optimized to pass a single value of the query to the optional input of the function based on the input-output correlator and wherein the query optimizer creates an optimized query that passes the single value to the optional input of the function based on the input-output correlator.

The claims and disclosure herein further support a computer-implemented method executed by at least one processor for improving efficiency of a computer database system utilizing an input-output correlator comprising: receiving a query to a database system that calls a function; determining whether a create function statement that creates the function includes an input-output correlator that indicates a correlation between an input to the function and an output of the function; determining whether the query can be can be optimized to pass a value of the query to an optional input parameter of the function; and creating an optimized query that passes the single input value to the optional input of the function.

The claims and disclosure herein additionally support a computer-implemented method executed by at least one processor for improving efficiency of a computer database system utilizing an input-output correlator comprising: receiving a query to a database system that calls a function; determining whether a create function statement that creates the function includes an input-output correlator that indicates a correlation between an input to the function and an output of the function, wherein the input-output correlator is provided in structured query language syntax of a DEFAULT clause of the create function statement; determining whether the query can be can be optimized to pass an input value to the function; and creating an optimized query that passes the input value to the function.

A query optimizer is described that utilizes an input-output correlator used with a create table function that indicates a correlation between an input to the table function and an output of the table function to improve the efficiency of a computer database system. The query optimizer uses the input-output correlator to determine whether it can pass the input to the function. When the query optimizer determines it can pass an input to the function the resulting optimized query returns a significantly smaller amount of data from the database thereby reducing the load on database resources.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:
1. An apparatus comprising:
at least one processor;
a memory coupled to the at least one processor;
a database residing in the memory having database data;

a create function statement that creates a function with an optional input parameter with an input-output correlator that indicates a correlation between an input to the function and an output of the function;

a query that calls the function; and a query optimizer that determines when the query can be optimized to pass a single value of the query to the optional input of the function based on the input-output correlator and creates an optimized query that passes the single value to the optional input of the function based on the input-output correlator.

2. The apparatus of claim 1 wherein the input-output correlator is provided in structured query language syntax of the create function statement.

3. The apparatus of claim 2 wherein the input-output correlator is a parameter of the DEFAULT clause of the create function statement.

4. The apparatus of claim 2 wherein the input-output correlator uses the mnemonic 'OR OUTPUT' in the DEFAULT clause of the create function statement.

5. The apparatus of claim 1 wherein the function outputs a table.

6. The apparatus of claim 1 wherein when an input parameter associated with the input-output correlator in the create function statement is not specified, the optimizer optimizes the query to pass the single value to the table function for that input parameter where an isolatable equal predicate is specified in the query that compares an associated result column to the single value.

7. The apparatus of claim 6 wherein when there is no isolatable equal predicate specified in the query that compares an associated result column to the single value, the query is optimized to pass a default value to the function to cause the function to use the default value for the input parameter in the create function statement.

8. A computer-implemented method executed by at least one processor for improving efficiency of a computer database system utilizing an input-output correlator comprising:

receiving a query to a database system that calls a function;

determining whether a create function statement that creates the function includes an input-output correlator that indicates a correlation between an input to the function and an output of the function;

determining whether the query can be can be optimized to pass a value of the query to an optional input parameter of the function; and creating an optimized query that passes the single input value to the optional input of the function.

9. The method of claim 8 wherein the input-output correlator is provided in structured query language syntax of the create function statement.

10. The method of claim 9 wherein the input-output correlator is a parameter of the DEFAULT clause of the create function statement.

11. The method of claim 10 wherein the input-output correlator uses the mnemonic 'OR OUTPUT' in the DEFAULT clause of the create function statement.

12. The method of claim 8 further comprising:

determining when an isolatable equal predicate is specified in the query;

determining when the query compares an associated result column to a single value; and optimizing the query to pass the single value to the function as the input when an isolatable equal predicate is specified in the query that compares an associated result column to the single value.

13. The method of claim 12 further comprising:

when there is no isolatable equal predicate specified in the query that compares the associated result column to the single value, optimizing the query to pass a default value to the function to cause the function to use the default value for the input parameter in the create function statement.

14. A computer-implemented method executed by at least one processor for improving efficiency of a computer database system utilizing an input-output correlator comprising:

receiving a query to a database system that calls a function;

determining whether a create function statement that creates the function includes an input-output correlator that indicates a correlation between an input to the function and an output of the function, wherein the input-output correlator is provided in structured query language syntax of a DEFAULT clause of the create function statement;

determining whether the query can be can be optimized to pass an input value to the function; and creating an optimized query that passes the input value to the function.

15. The method of claim 14 further comprising:

determining when an isolatable equal predicate is specified in the query;

determining when the query compares an associated result column to the single value; and optimizing the query to pass the single value to the table function for that parameter where an isolatable equal predicate is specified in the query that compares an associated result column to the single value.

16. The method of claim 15 further comprising:

when there is no isolatable equal predicate specified in the query that compares an associated result column to the single value, optimizing the query to pass a default value to the function to cause the function to use the default value for the input parameter in the create function statement.

* * * * *